(12) United States Patent
Kajino et al.

(10) Patent No.: US 10,700,619 B2
(45) Date of Patent: Jun. 30, 2020

(54) PIEZOELECTRIC ACTUATOR, PIEZOELECTRIC MOTOR, ROBOT, HAND, AND PUMP

(71) Applicant: Seiko Epson Corporation, Tokyo (JP)

(72) Inventors: Kiichi Kajino, Matsumoto (JP); Osamu Miyazawa, Hara (JP)

(73) Assignee: Seiko Epson Corporation (JP)

( * ) Notice: Subject to any disclaimer, the term of this patent is extended or adjusted under 35 U.S.C. 154(b) by 643 days.

(21) Appl. No.: 15/469,905

(22) Filed: Mar. 27, 2017

(65) Prior Publication Data

US 2017/0279378 A1   Sep. 28, 2017

(30) Foreign Application Priority Data

Mar. 28, 2016 (JP) ................ 2016-063182

(51) Int. Cl.

| | |
|---|---|
| *H01L 41/09* | (2006.01) |
| *H02N 2/00* | (2006.01) |
| *H02N 2/10* | (2006.01) |
| *B25J 15/02* | (2006.01) |
| *F04B 43/09* | (2006.01) |
| *F04B 43/12* | (2006.01) |
| *F04B 13/00* | (2006.01) |
| *F04B 23/02* | (2006.01) |
| *F04B 43/08* | (2006.01) |
| *B25J 9/12* | (2006.01) |

(Continued)

(52) U.S. Cl.
CPC ............. *H02N 2/005* (2013.01); *B25J 9/123* (2013.01); *B25J 15/0009* (2013.01); *B25J 15/0293* (2013.01); *B25J 15/08* (2013.01); *F04B 13/00* (2013.01); *F04B 17/003* (2013.01); *F04B 23/02* (2013.01); *F04B 43/082* (2013.01); *F04B 43/095* (2013.01); *F04B 43/12* (2013.01); *H02N 2/001* (2013.01); *H02N 2/0025* (2013.01); *H02N 2/103* (2013.01); *H02N 2/12* (2013.01)

(58) Field of Classification Search
CPC .......... H02N 2/005; H02N 2/12; H02N 2/103; H02N 2/0025; H02N 2/001; F04B 13/00; F04B 17/003; F04B 23/02; F04B 43/082; F04B 43/095; F04B 43/12; B25J 9/123; B25J 15/009; B25J 15/08
USPC ......... 310/317, 323.01–323.19, 323.21, 328, 310/366
See application file for complete search history.

(56) References Cited

U.S. PATENT DOCUMENTS 4,928,030 A * 5/1990 Culp ................. H01L 41/0825
                                                          310/317
5,032,753 A * 7/1991 Yamaguchi ............ H02N 2/001
                                                          310/317
(Continued)

FOREIGN PATENT DOCUMENTS

JP   H01-268464 A   10/1989
JP   2976489 B2   11/1999
(Continued)

*Primary Examiner* — Thomas M Dougherty
(74) *Attorney, Agent, or Firm* — Harness, Dickey & Pierce, P.L.C.

(57) ABSTRACT

A piezoelectric actuator includes a plurality of piezoelectric elements that generate a driving force to be transmitted to a driven portion; and a power supply portion that supplies power to the plurality of piezoelectric elements. The plurality of piezoelectric elements are electrically connected to the power supply portion in parallel.

10 Claims, 10 Drawing Sheets

(51) Int. Cl.
  *B25J 15/00*  (2006.01)
  *B25J 15/08*  (2006.01)
  *F04B 17/00*  (2006.01)
  *H02N 2/12*   (2006.01)

(56) References Cited

U.S. PATENT DOCUMENTS

| | | | | |
|---|---|---|---|---|
| 5,237,236 | A * | 8/1993 | Culp | H01L 41/0913 |
| | | | | 310/317 |
| 6,066,911 | A * | 5/2000 | Lindemann | H01L 41/083 |
| | | | | 310/323.02 |
| 7,075,211 | B1 * | 7/2006 | Ganor | H01L 41/0913 |
| | | | | 310/317 |
| 2004/0074300 | A1 * | 4/2004 | Karrai | B82Y 35/00 |
| | | | | 73/514.34 |
| 2004/0256956 | A1 | 12/2004 | Miyazawa | |
| 2009/0236938 | A1 * | 9/2009 | Bromfield | B06B 1/0611 |
| | | | | 310/323.19 |
| 2016/0261211 | A1 * | 9/2016 | Miyazawa | B25J 9/12 |

FOREIGN PATENT DOCUMENTS

| | | |
|---|---|---|
| JP | 2004-320979 A | 11/2004 |
| JP | 2010-259193 A | 11/2010 |
| JP | 2013-085371 A | 5/2013 |
| JP | 2015-115542 A | 6/2015 |
| JP | 2016-040994 A | 3/2016 |

* cited by examiner

PIEZOELECTRIC ACTUATOR, PIEZOELECTRIC MOTOR, ROBOT, HAND, AND PUMP

BACKGROUND

1. Technical Field

The present invention relates to a piezoelectric actuator, a piezoelectric motor, a robot, a hand, and a pump.

2. Related Art

A piezoelectric actuator including a plurality of piezoelectric elements is known (see JP-A-2015-115542). For example, the piezoelectric actuator described in JP-A-2015-115542 includes a piezoelectric actuator body having the plurality of piezoelectric elements and a transmission body provided on an end portion of the piezoelectric actuator body, and the plurality of piezoelectric elements are electrically connected to each other in series.

In the piezoelectric actuator described in JP-A-2015-115542, since the plurality of piezoelectric elements are electrically connected to each other in series, if only one piezoelectric element fails, other piezoelectric elements cannot be driven and as a result, there is a problem that the transmission body cannot be driven.

SUMMARY

An advantage of some aspects of the invention is to provide a piezoelectric actuator in which even if a part of a plurality of piezoelectric elements fails, remaining piezoelectric elements can be driven, and to provide a piezoelectric motor including such a piezoelectric actuator, a robot, a hand, and a pump.

The advantage can be achieved by the following configurations.

A piezoelectric actuator according to an aspect of the invention includes a plurality of piezoelectric elements that generate a driving force to be transmitted to a driven portion; and a power supply portion that supplies power to each of the plurality of piezoelectric elements, in which the plurality of piezoelectric elements are respectively electrically connected to the power supply portion in parallel.

According to the piezoelectric actuator, even if a part of the plurality of piezoelectric elements fails due to disconnection or the like, it is possible to transmit the driving force to the driven portion by driving the remaining piezoelectric element.

In the piezoelectric actuator according to the aspect of the invention, it is preferable that the plurality of piezoelectric elements are stacked on one another.

Therefore, it is possible to transmit a large driving force to one place of the driven portion. In addition, even if a part of the piezoelectric elements fails, the failed piezoelectric element can be driven by driving the remaining piezoelectric element.

It is preferable that the piezoelectric actuator according to the aspect of the invention includes a plurality of sets of the stacked plurality of piezoelectric elements.

With this configuration, it is possible to transmit the driving force to a plurality of places of the driven portion.

In the piezoelectric actuator according to the aspect of the invention, it is preferable that the driving force is a force for rotating the driven portion.

With this configuration, it is possible to rotate the driven portion.

It is preferable that the piezoelectric actuator according to the aspect of the invention further includes a coil that is electrically connected to the plurality of piezoelectric elements in parallel.

With this configuration, it is possible to reduce a voltage effect due to the plurality of piezoelectric elements being electrically connected in parallel.

In the piezoelectric actuator according to the aspect of the invention, it is preferable that an inductance of the coil is variable.

With this configuration, even if a part of the plurality of piezoelectric elements fails, it is possible to reduce the voltage effect due to the plurality of remaining piezoelectric elements being electrically connected in parallel by adjusting the inductance of the coil.

A piezoelectric motor according to an aspect of the invention includes the piezoelectric actuator of the aspect of the invention.

With this configuration, it is possible to provide a piezoelectric motor having excellent reliability.

A robot according to an aspect of the invention includes the piezoelectric actuator of the aspect of the invention.

With this configuration, it is possible to provide a robot having excellent reliability.

A hand according to an aspect of the invention includes the piezoelectric actuator of the aspect of the invention.

With this configuration, it is possible to provide a hand having excellent reliability.

A pump according to an aspect of the invention includes the piezoelectric actuator of the aspect of the invention.

With this configuration, it is possible to provide a pump having excellent reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a piezoelectric actuator, a piezoelectric motor, a robot, a hand, and a pump according to the invention will be described in detail with reference to preferable embodiments illustrated in annexed drawings.

1. Piezoelectric Actuator

First, an embodiment of the piezoelectric actuator according to the invention will be described.

First Embodiment

Figure 1:
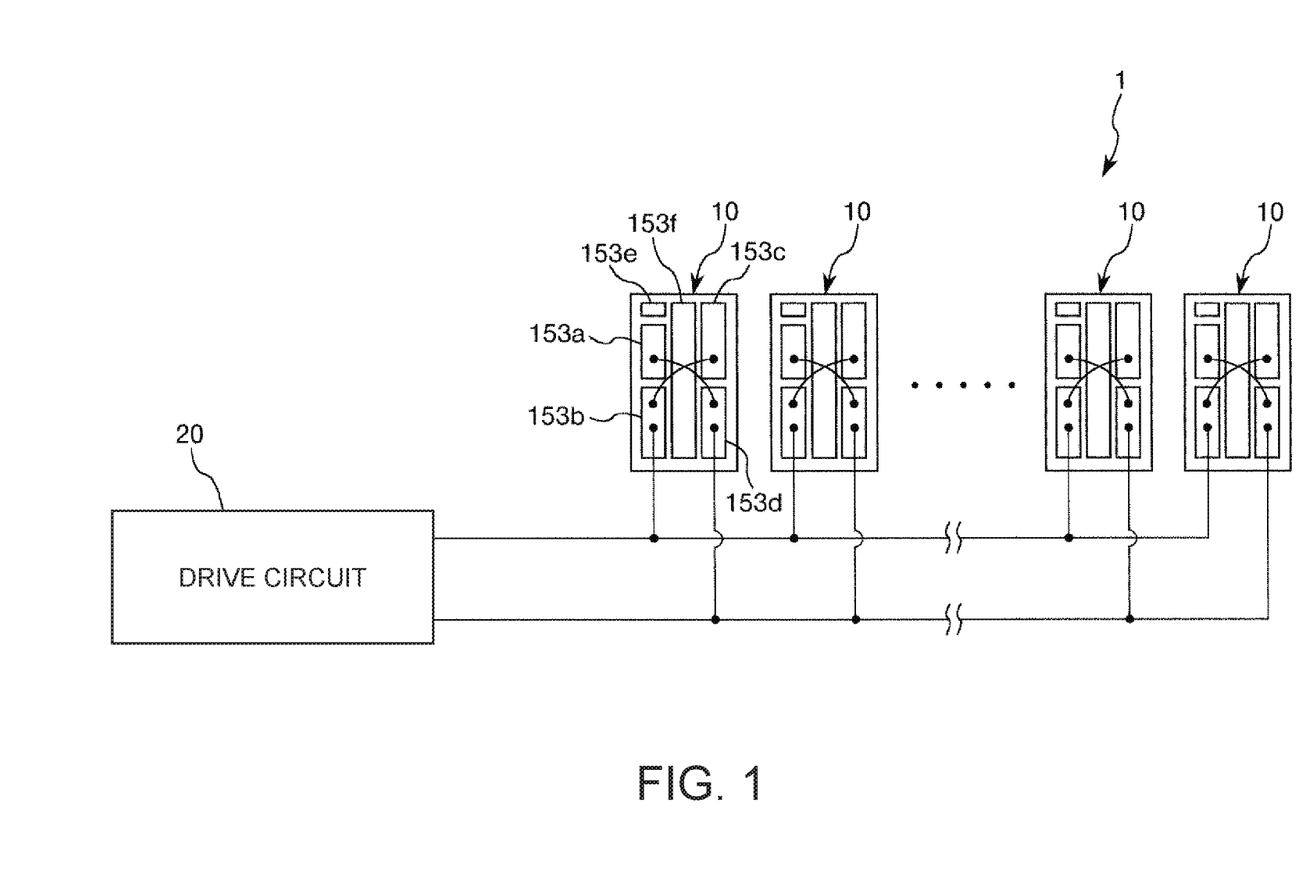
FIG. 1 is a schematic view illustrating an entire configuration of a piezoelectric actuator according to a first embodiment of the invention.
Figure 2:
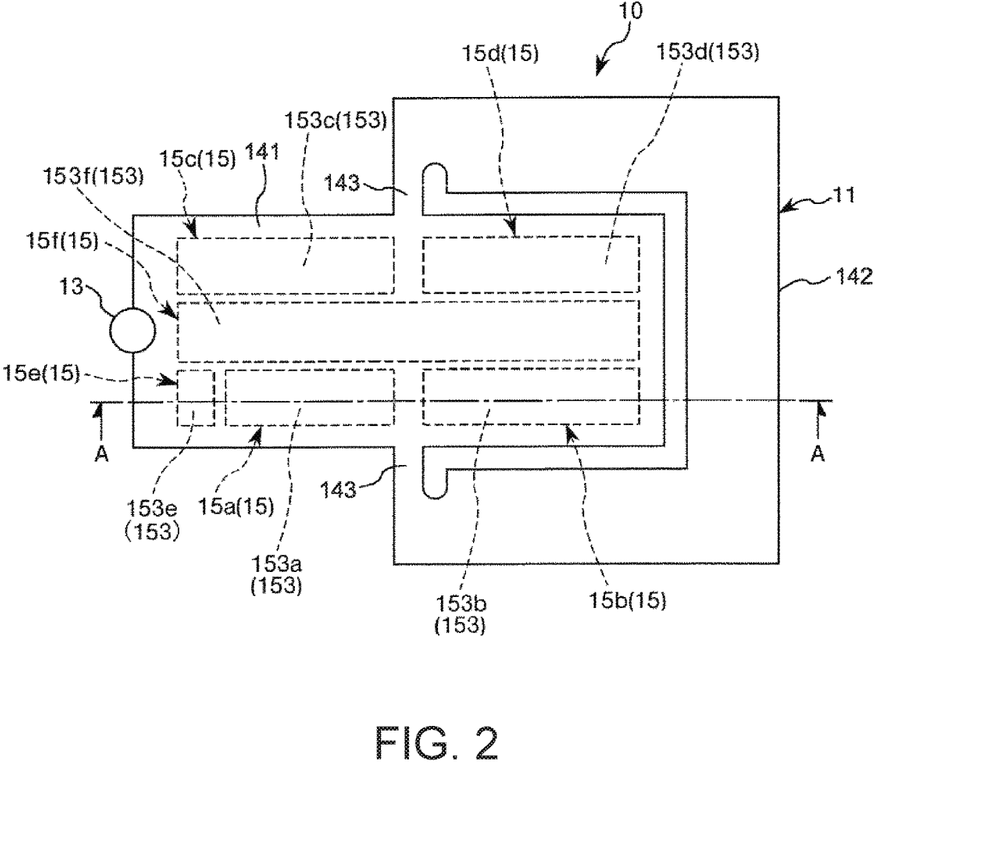
FIG. 2 is a plan view illustrating a piezoelectric vibrating body included in the piezoelectric actuator illustrated in FIG. 1.
Figure 3:
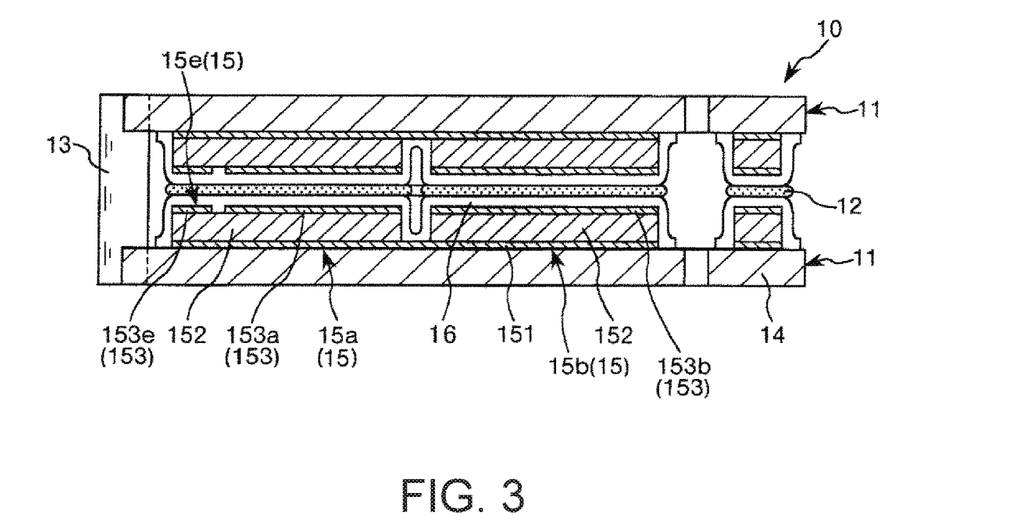
FIG. 3 is a sectional view that is taken along line A-A in FIG. 2.
Figure 4:
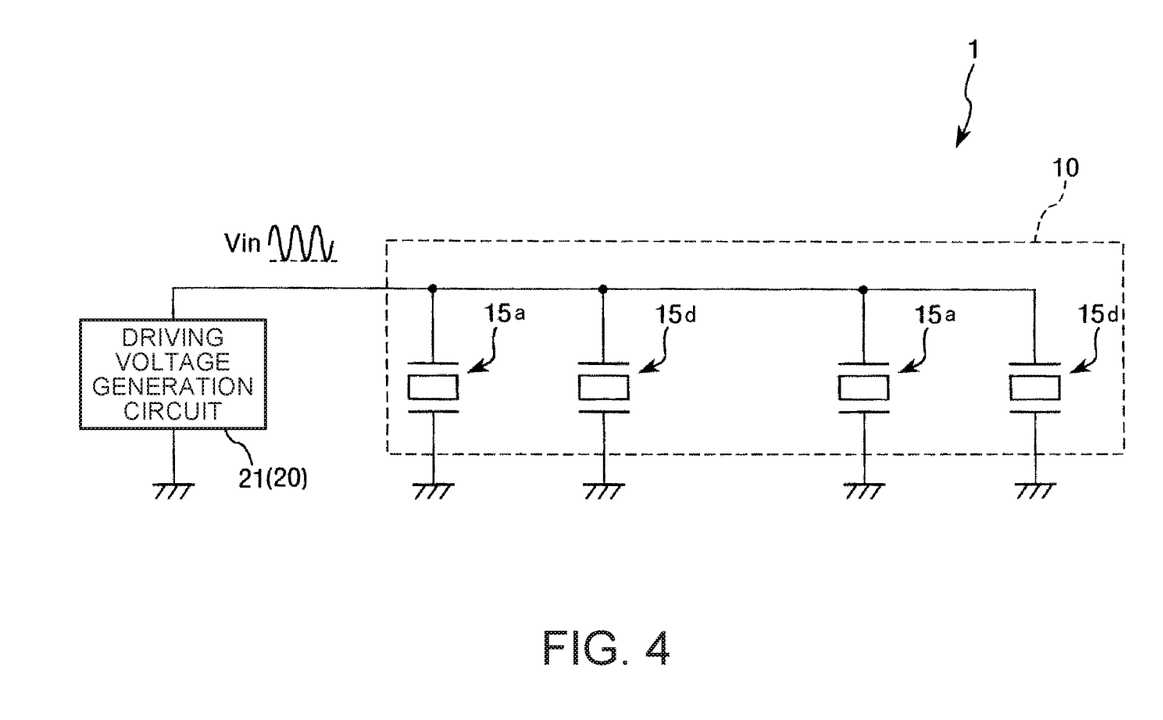
FIG. 4 is a view illustrating a connection state of a plurality of piezoelectric elements included in the piezoelectric actuator illustrated in FIG. 1.
Figure 5:
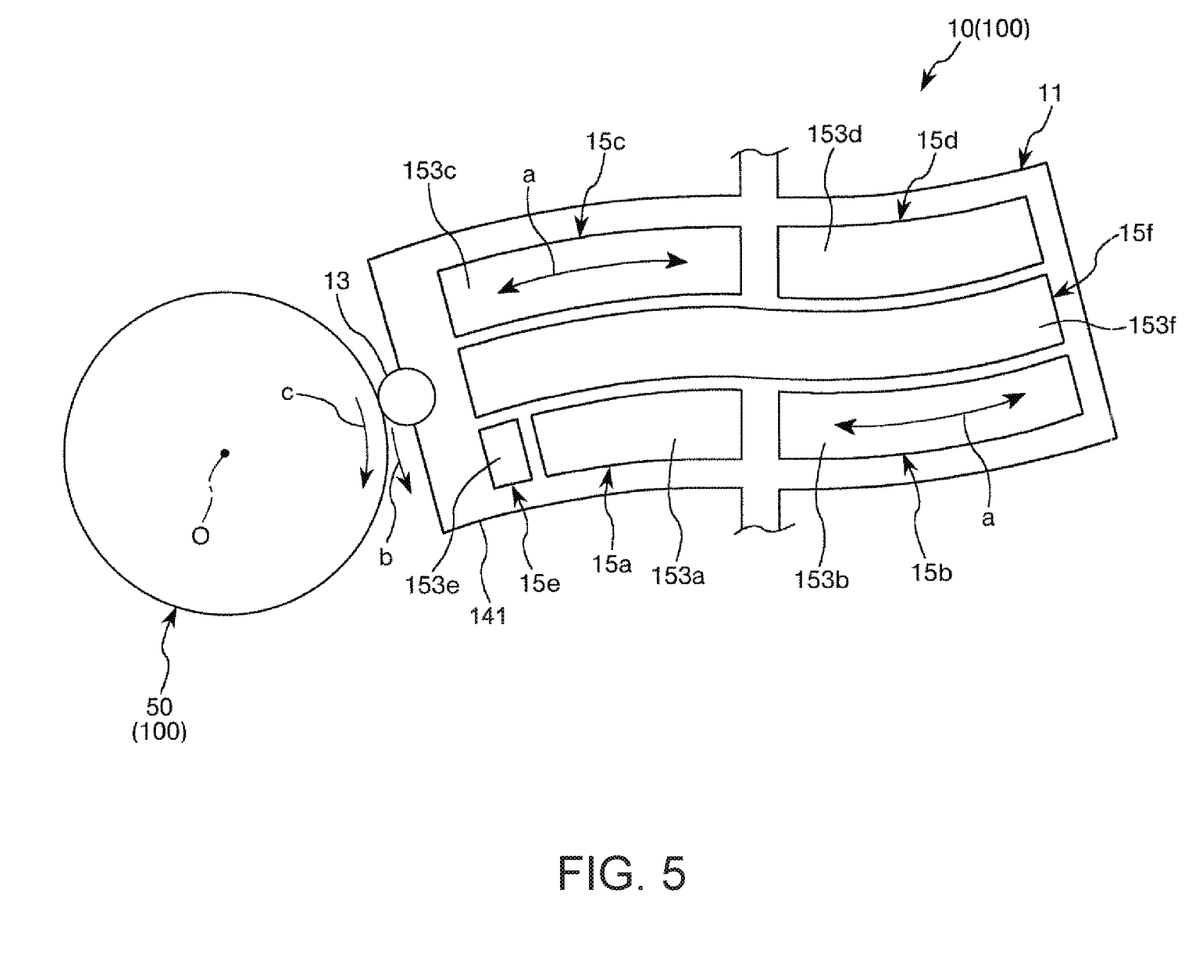
FIG. 5 is a view explaining an operation of the piezoelectric vibrating body illustrated in FIG. 2.

FIG. 1 is a schematic view illustrating an entire configuration of the piezoelectric actuator according to the first embodiment of the invention. FIG. 2 is a plan view illustrating a piezoelectric vibrating body included in the piezoelectric actuator illustrated in FIG. 1. FIG. 3 is a sectional view that is taken along line A-A in FIG. 2. FIG. 4 is a view illustrating a connection state of a plurality of piezoelectric elements included in the piezoelectric actuator illustrated in FIG. 1. FIG. 5 is a view explaining an operation of the piezoelectric vibrating body illustrated in FIG. 2.

A piezoelectric actuator 1 illustrated in FIG. 1 has a plurality of piezoelectric vibrating bodies 10 for generating a driving force applied to a driven portion (not illustrated) and a drive circuit 20 for driving the plurality of piezoelectric vibrating bodies 10. Hereinafter, each portion of the piezoelectric actuator 1 will be described in sequence.

Piezoelectric Vibrating Body

The plurality of piezoelectric vibrating bodies 10 are respectively configured in the same manner. In addition, as illustrated in FIG. 1, the plurality of piezoelectric vibrating bodies 10 are electrically connected to each other in parallel. The number of the piezoelectric vibrating bodies 10 is four or more in the illustrated example, but is not limited to the example, and may be two, three, or five or more.

As illustrated in FIG. 3, the piezoelectric vibrating body 10 illustrated in FIG. 2 has two piezoelectric element units 11, an adhesive layer 12 that joins the two piezoelectric element units 11 to each other, and a projection member 13 that is provided so as to straddle the two piezoelectric element units 11. Here, the two piezoelectric element units 11 are configured symmetrically (vertically symmetrical in FIG. 3) with respect to the adhesive layer 12 and have the same configuration.

Each piezoelectric element unit 11 has a substrate 14, a plurality of piezoelectric elements 15 that are provided on the substrate 14, and a protection layer 16 that covers the plurality of piezoelectric elements 15.

As illustrated in FIG. 2, the substrate 14 has a drive portion 141, a fixing portion 142, a pair of connecting portions 143 that connects the drive portion 141 and the fixing portion 142. In the embodiment, the drive portion 141 has a rectangular shape in a plan view (hereinafter, also referred to simply as "plan view") viewed from a thickness direction of the substrate 14. In addition, the fixing portion 142 is provided apart from the drive portion 141 along an outer periphery of a portion of the drive portion 141 on one end side in a longitudinal direction in a plan view. In addition, the pair of connecting portions 143 is disposed on both sides of the drive portion 141 in a width direction (direction orthogonal to the longitudinal direction). Therefore, the pair of connecting portions 143 connects a center portion of the drive portion 141 in the longitudinal direction and the fixing portion 142. Moreover, if desired deformation or vibration of the drive portion 141 is possible, shapes and arrangements of the drive portion 141, the fixing portion 142, and the pair of connecting portions 143, and the like are not limited to the example described above. For example, the fixing portion 142 may be separately provided for each connecting portion 143. In addition, the number, the shape, and the arrangement of the connecting portions 143, and the like are also arbitrary.

As the substrate 14, for example, a silicon substrate can be used. In addition, although not illustrated, an insulating layer is provided on a surface of the substrate 14 on a piezoelectric element 15 side. The insulating layer is not particularly limited, but, for example, in a case where the silicon substrate is used as the substrate 14, the insulating layer can be formed by thermally oxidizing the surface of the silicon substrate.

The plurality of piezoelectric elements 15 are disposed on such a drive portion 141 of the substrate 14. In the embodiment, the plurality of piezoelectric elements 15 are configured of five driving piezoelectric elements 15a, 15b, 15c, 15d, and 15f, and one detecting piezoelectric element 15e. Here, the driving piezoelectric elements 15a and 15c included in the plurality of piezoelectric vibrating bodies 10 are the "plurality of piezoelectric elements" generating the driving force transmitted to the driven portion. In addition, the driving piezoelectric elements 15b and 15d included in the plurality of piezoelectric vibrating bodies 10 are also the "plurality of piezoelectric elements" generating the driving force transmitted to the driven portion. In addition, the driving piezoelectric elements 15f included in the plurality of piezoelectric vibrating bodies 10 are also the "plurality of piezoelectric elements" generating the driving force transmitted to the driven portion.

The piezoelectric element 15f is disposed at the center portion of the drive portion 141 in the width direction along the longitudinal direction of the drive portion 141. The piezoelectric elements 15a and 15b are disposed on one side of the drive portion 141 in the width direction with respect to the piezoelectric element 15f and the piezoelectric elements 15c and 15d are disposed on the other side thereof. The piezoelectric elements 15a, 15b, 15c, and 15d are disposed corresponding to four regions that are divided along the longitudinal direction and the width direction of the drive portion 141. In the embodiment, the piezoelectric elements 15a and 15b are disposed on one side of the drive portion 141 in the width direction and the piezoelectric elements 15c and 15d are disposed on the other side of the drive portion 141 in the width direction. In addition, the piezoelectric elements 15a and 15c are disposed on one side of the drive portion 141 in the longitudinal direction and the piezoelectric elements 15b and 15d are disposed on the other side of the drive portion 141 in the longitudinal direction. In addition, the piezoelectric element 15e is disposed on a side opposite to the piezoelectric element 15b with respect to the piezoelectric element 15a on one side of the drive portion 141 in the width direction. Moreover, the disposition of the piezoelectric element 15e is not limited to the illustrated example.

The piezoelectric elements 15a, 15b, 15c, 15d, 15e, and 15f that are disposed as described above are respectively have first electrodes 151 provided on the substrate 14, piezoelectric bodies 152 provided on the first electrodes 151, and second electrodes 153 provided on the piezoelectric bodies 152.

The first electrodes 151 are common electrodes commonly provided in the piezoelectric elements 15a, 15b, 15c, 15d, 15e, and 15f. On the other hand, the second electrode 153 is individual electrode individually provided in each of the piezoelectric elements 15a, 15b, 15c, 15d, 15e, and 15f. In the embodiment, the piezoelectric body 152 is individually provided in each of the piezoelectric elements 15a, 15b, 15c, 15d, and 15f, but is commonly provided in the piezoelectric elements 15a and 15e. Moreover, the piezoelectric body 152 may be individually provided in each of the piezoelectric elements 15a and 15e, or may be integrally and commonly provided in the piezoelectric elements 15a, 15b, 15c, 15d, 15e, and 15f.

Here, a plurality of second electrodes 153 are configured of a second electrode 153a provided corresponding to the piezoelectric element 15a, a second electrode 153b provided corresponding to the piezoelectric element 15b, a second electrode 153c provided corresponding to the piezoelectric element 15c, a second electrode 153d provided corresponding to the piezoelectric element 15d, a second electrode 153e provided corresponding to the piezoelectric element 15e, and a second electrode 153f provided corresponding to the piezoelectric element 15f.

The second electrode 153a and the second electrode 153d are electrically connected via wiring (not illustrated). Similarly, the second electrode 153b and the second electrode 153c are electrically connected via wiring (not illustrated). In addition, an insulating film (not illustrated) such as SiO$_2$ is appropriately provided on the second electrode 153, between the two wiring, or the like. In addition, the first electrode 151 is grounded (connected to a ground potential) via wiring (not illustrated). In addition, the first electrodes 151 and the second electrodes 153a, or the second electrodes 153d and the second electrodes 153b, or the second electrodes 153c and the second electrodes 153f of the two piezoelectric element units 11 are respectively electrically connected via wiring (not illustrated).

In the two piezoelectric element units 11 included in the piezoelectric vibrating body 10, as illustrated in FIG. 4, the piezoelectric elements 15a and 15d are electrically connected in parallel by such wiring. Similarly, in the two piezoelectric element units 11 included in the piezoelectric vibrating body 10, the piezoelectric elements 15b and 15c are electrically connected in parallel. In addition, in the two piezoelectric element units 11 included in the piezoelectric vibrating body 10, the piezoelectric elements 15f are electrically connected in parallel. In addition, as illustrated in FIG. 1, in the plurality of piezoelectric vibrating bodies 10, the driving piezoelectric elements 15a and 15d are electrically connected in parallel. In addition, in the plurality of piezoelectric vibrating bodies 10, the piezoelectric elements 15b and 15c are electrically connected in parallel. In addition, in the plurality of piezoelectric vibrating bodies 10, the piezoelectric elements 15f are electrically connected in parallel.

As a configuration material of each of the first electrode 151 and the second electrode 153, for example, a metal material such as aluminum (Al), nickel (Ni), gold (Au), platinum (Pt), iridium (Ir), or copper (Cu) is used. In addition, the first electrode 151 and the second electrode 153 can be respectively formed by sputtering.

The piezoelectric body 152 is configured to expand and contract in a direction along the longitudinal direction of the drive portion 141 by applying an electric field in a direction along the thickness direction of the drive portion 141. As a configuration material of such a piezoelectric body 152, for example, piezoelectric ceramics such as lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, and lead scandium niobate can be used. The piezoelectric body 152 configured of the piezoelectric ceramics may be formed, for example, of a bulk material or may be formed by using a sol-gel method. Moreover, as a configuration material of the piezoelectric body 152, polyvinylidene fluoride, quartz, or the like may be used.

The protection layer 16 is provided on a plurality of piezoelectric elements 15a, 15b, 15c, 15d, and 15e having the configuration described above so as to collectively cover the piezoelectric elements 15a, 15b, 15c, 15d, and 15e. As a configuration material of the protection layer 16, for example, silicone resin, epoxy resin, polyimide resin, or the like can be used. In addition, the protection layer 16 can be formed, for example, by using a spin coating method.

A stacked body configured of the first electrode 151, the piezoelectric body 152, the second electrode 153, and the protection layer 16 described above is also disposed on the fixing portion 142 of the substrate 14. Therefore, it is possible to stably join the two piezoelectric element units 11 via the adhesive layer 12.

The protection layers 16 of the two piezoelectric element units 11 having the configuration described above are joined via the adhesive layer 12. As the adhesive layer 12, examples thereof include epoxy resin and the like.

Thus, the piezoelectric elements 15 of the two piezoelectric element units 11 are stacked on one another. Therefore, it is possible to transmit a large driving force with respect to one place of the driven portion. In addition, even if the piezoelectric element 15 of one piezoelectric element unit 11 fails, it is possible to drive the failed piezoelectric element 15 of the piezoelectric element unit 11 in accordance with the driving of the remaining piezoelectric element 15 of the piezoelectric element unit 11.

In addition, the projection member 13 is fixed, for example, by adhesive at end portions of the drive portions 141 of the two piezoelectric element units 11 on a side opposite to the fixing portion 142. In the embodiment, the projection member 13 has a cylindrical shape and a part of a cylindrical surface thereof is provided to protrude from the drive portion 141. As a configuration material of the projection member 13, for example, a material excellent in abrasion resistance is preferable, and, examples thereof include ceramics and the like. Moreover, a shape of the projection member 13 is not limited to the cylindrical shape as long as the projection member 13 can transmit the driving force to a driven portion.

Drive Circuit

As illustrated in FIG. 1, the drive circuit 20 is electrically connected to each of the second electrodes 153b and 153d of the five piezoelectric vibrating bodies 10. The drive circuit 20 has a function of driving the piezoelectric elements 15a, 15b, 15c, and 15d by inputting a voltage signal, in which a voltage value is periodically changed, into the second electrodes 153b and 153d as a drive signal. In addition, as illustrated in FIG. 4, such a drive circuit 20 has a driving voltage generation circuit 21 that outputs a voltage signal Vin in which a voltage value is periodically changed. In addition, although not illustrated, the drive circuit 20 is electrically connected to each second electrode 153f of the five piezoelectric vibrating bodies 10. Therefore, the drive circuit 20 has a function of driving the piezoelectric element 15f by inputting a voltage signal, in which a voltage value is periodically changed, into the second electrode 153f as a drive signal. Here, the driving voltage generation circuit 21 is a "power supply portion" that supplies power to each of a plurality of piezoelectric elements 15a, 15b, 15c, 15d, and 15f.

If the drive signal, in which the voltage value is periodically changed, is input into the second electrode 153b, each of the piezoelectric elements 15b and 15c repeats expansion and contraction in directions indicated by arrows a in FIG. 5. Therefore, the projection member 13, which is provided at one end portion of the drive portion 141 in the longitudinal direction, reciprocates (vibrates) in a direction opposite to a direction indicated by an arrow b in FIG. 5 in accordance with bending vibration of the drive portion 141. It is possible to rotate a rotor 50 in a direction indicated by an arrow c in FIG. 5 around a rotation axis O by transmitting the driving force of the projection member 13, which vibrates as described above, to the rotor 50 that is a driven portion as a rotational force. In this case, it is possible to increase the driving force given from the projection member 13 to the rotor 50 or to control a trajectory of the projection member 13 by inputting a drive signal synchronized with the piezoelectric elements 15b and 15c into the piezoelectric element 15f. Moreover, it is possible to cause the projection member 13 to reciprocate (vibrate) in the direction indicated by the arrow b in FIG. 5 by driving the piezoelectric elements 15a and 15d similarly, even by inputting the drive signal, in which the voltage value is periodically changed, into the second electrode 153d. In this case, the drive signal may be input into the second electrode 153b. In this case, for example, a phase of the drive signal may be shifted by 180 degrees from a phase of the drive signal input into the second electrode 153d.

According to the piezoelectric actuator 1 as described above, the piezoelectric elements 15a and 15d of the plurality of piezoelectric vibrating bodies 10 are electrically connected to the same driving voltage generation circuit 21 in parallel. Therefore, even if a part of the plurality of piezoelectric elements 15a and 15d included in the piezoelectric actuator 1 fails due to disconnection or the like, it is possible to transmit the driving force to the driven portion by driving the remaining piezoelectric elements. Similarly, the piezoelectric elements 15b and 15c of the plurality of piezoelectric vibrating bodies 10 are electrically connected in parallel. Therefore, even if apart of the plurality of piezoelectric elements 15b and 15c included in the piezoelectric actuator 1 fails due to disconnection or the like, it is possible to transmit the driving force to the driven portion by driving the remaining piezoelectric elements.

Second Embodiment

A second embodiment of the invention will be described.

Figure 6:
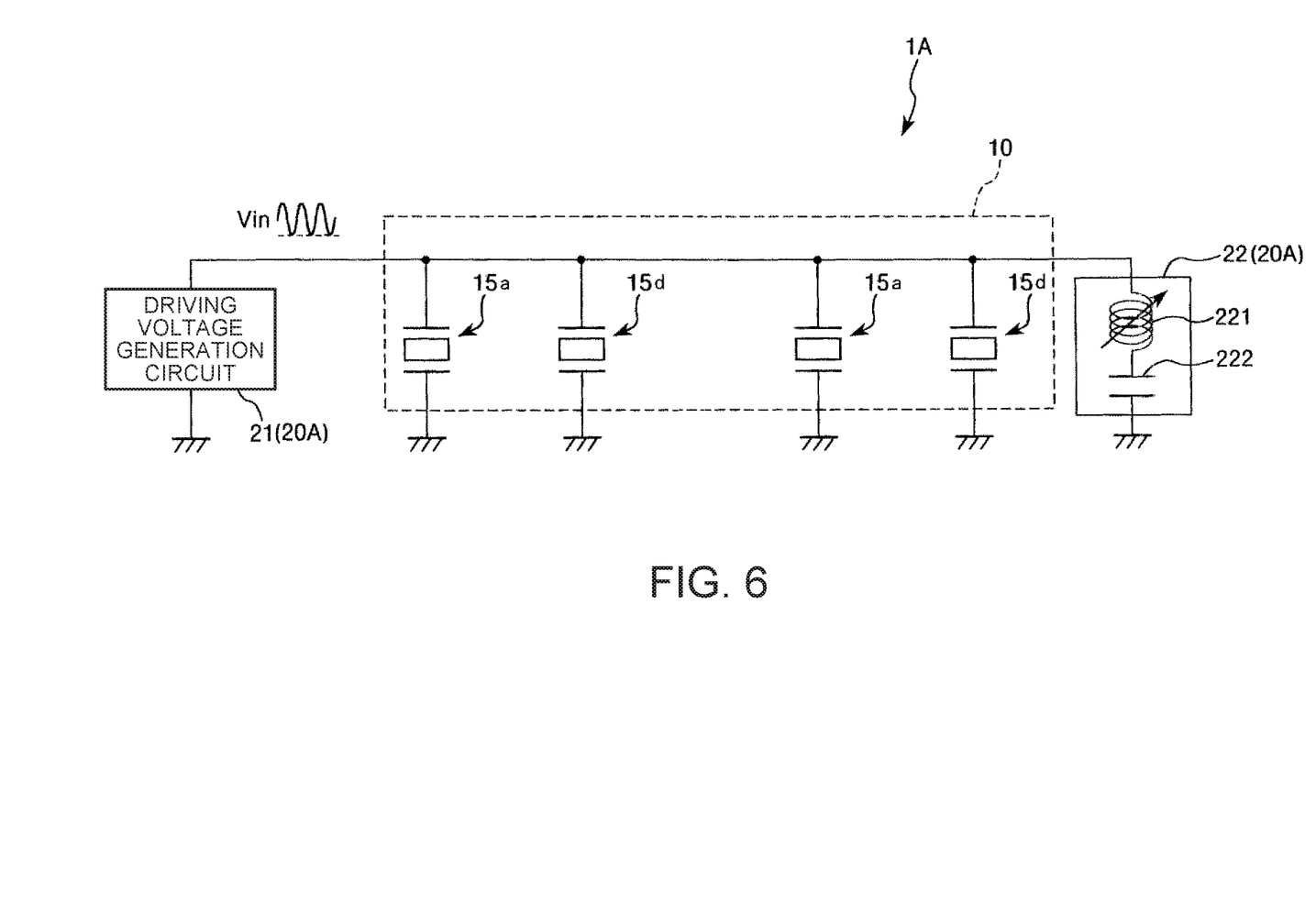
FIG. 6 is a view illustrating a connection state of a plurality of piezoelectric elements included in a piezoelectric actuator according to a second embodiment of the invention.

FIG. 6 is a view illustrating a connection state of a plurality of piezoelectric elements included in a piezoelectric actuator according to the second embodiment of the invention.

The embodiment is similar to the first embodiment described above except that a coil and a capacitor are added.

Moreover, in the following description, the embodiment will be described focusing on differences from the embodiment described above and description of similar matters will be omitted. In addition, in FIG. 6, the same reference numerals are given to the same configurations as those in the embodiment described above.

A piezoelectric actuator 1A illustrated in FIG. 6 includes a drive circuit 20A having a driving voltage generation circuit 21 and a resonance element 22. The resonance element 22 is electrically connected to a plurality of piezoelectric elements 15a and 15d in parallel. The resonance element 22 has a coil 221 and a capacitor 222 electrically connected in series.

The coil 221 is an inductor having a property in which a change in a current appears as an induced electromotive force. When an inductance of the coil 221 is $L_S$, a frequency of a drive signal is $f_{Vin}$, and a total electrostatic capacitance of the plurality of piezoelectric elements 15a and 15d or the plurality of piezoelectric elements 15b and 15c electrically connected in parallel, is $C_{pz}$, it is preferable that a relationship of $f_{Vin}=1/(2\pi\sqrt{(L_S \cdot C_{pz})})$ is satisfied. Therefore, it is possible to configure a parallel resonance circuit by the plurality of piezoelectric elements 15a and 15d, or the plurality of piezoelectric elements 15b and 15c, and the coil 221. In addition, the resonant frequency of the parallel resonance circuit can be made to coincide with the frequency (frequency of an AC component) of a drive signal. Therefore, it is possible to reduce a current flowing through each of the piezoelectric elements 15a and 15d, or each of the piezoelectric elements 15b and 15c by the coil 221. As a result, it is possible to reduce power consumption of the drive circuit 20A.

As described above, the coil 221, which is electrically connected to the plurality of piezoelectric elements 15a and 15d, or the plurality of piezoelectric elements 15b and 15c in parallel, is provided. Therefore, it is possible to reduce a voltage effect by electrically connecting the plurality of piezoelectric elements 15a and 15d, or the plurality of piezoelectric elements 15b and 15c in parallel.

Moreover, even if the inductance $L_s$ deviates somewhat from a value satisfying the relationship described above, for example, when the value satisfying the relationship described above is 100%, if the value is in a range of 90% or more and 110% or less, it is possible to exert the effect described above. Here, it is preferable that a value of a right side of the expression of the relationship described above is within a range of ±5% of the frequency $f_{Vin}$.

In addition, the inductance of the coil 221 is variable. Therefore, even if a part of the plurality of piezoelectric elements 15a and 15d, or the plurality of piezoelectric elements 15b and 15c fails, it is possible to reduce the voltage effect by maintaining the relationship described above and electrically connecting the plurality of remaining piezoelectric elements in parallel by adjusting the inductance of the coil 221. Moreover, the inductance of the coil 221 may be fixed.

In addition, the capacitor 222 has a function of blocking a DC component flowing through the coil 221. Therefore, in a case where the drive signal has the DC component, it is possible to appropriately exert the effect of reducing the voltage effect described above by blocking the DC component flowing through the coil 221 by the capacitor 222. Moreover, in a case where the drive signal does not have the DC component, the capacitor 222 may be omitted.

It is also possible to drive the remaining piezoelectric elements by the second embodiment described above even if apart of the plurality of piezoelectric elements fails.

Third Embodiment

A third embodiment of the invention will be described.

Figure 7:
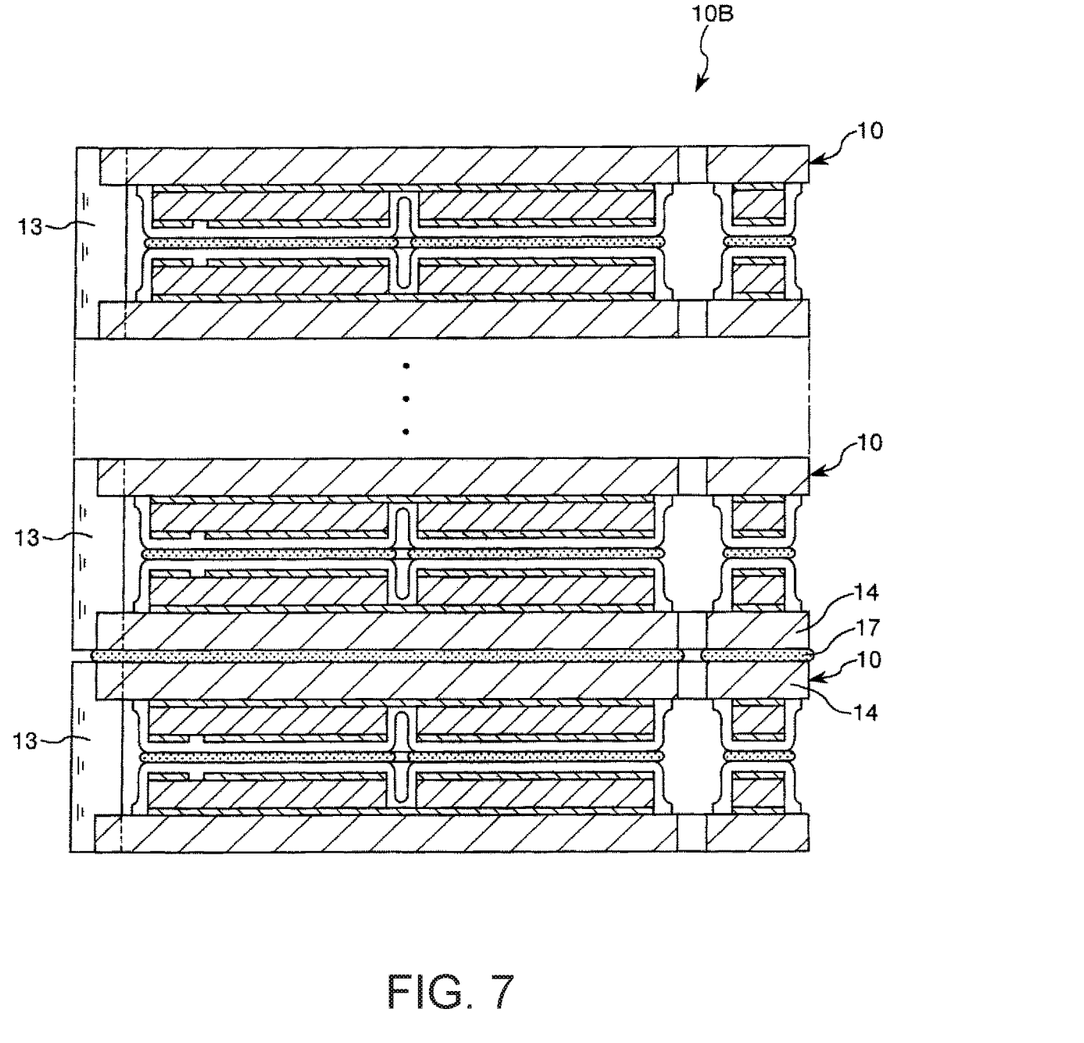
FIG. 7 is a sectional view illustrating a piezoelectric vibrating body included in a piezoelectric actuator according to a third embodiment of the invention.

FIG. 7 is a sectional view illustrating a piezoelectric vibrating body included in a piezoelectric actuator according to the third embodiment of the invention.

The embodiment is similar to the first embodiment described above except that a configuration of the piezoelectric vibrating body is different.

Moreover, in the following description, the embodiment will be described focusing on differences from the embodiments described above and description of similar matters will be omitted. In addition, in FIG. 7, the same reference numerals are given to the same configurations as those in the embodiment described above.

In a piezoelectric vibrating body 10B included in the piezoelectric actuator of the embodiment, as illustrated in FIG. 7, a plurality of piezoelectric vibrating bodies 10 are stacked on one another. Here, substrates 14 of two adjacent piezoelectric vibrating bodies 10 are joined by adhesive 17. The adhesive 17 is not particularly limited, and examples thereof include epoxy adhesive and the like. It is possible to transmit a large driving force to one place of a driven portion by laminating the piezoelectric elements 15 of the plurality of piezoelectric vibrating bodies 10. In addition, even if a part of the piezoelectric elements 15 of the piezoelectric vibrating bodies 10 fails, it is possible to drive the failed piezoelectric element 15 of the piezoelectric vibrating body 10 in accordance with driving of the remaining piezoelectric elements 15 of the piezoelectric vibrating bodies 10.

It is also possible to drive the remaining piezoelectric elements by the third embodiment described above even if apart of the plurality of piezoelectric elements fails.

2. Piezoelectric Motor

Next, an embodiment of a piezoelectric motor according to the invention will be described.

Figure 8:
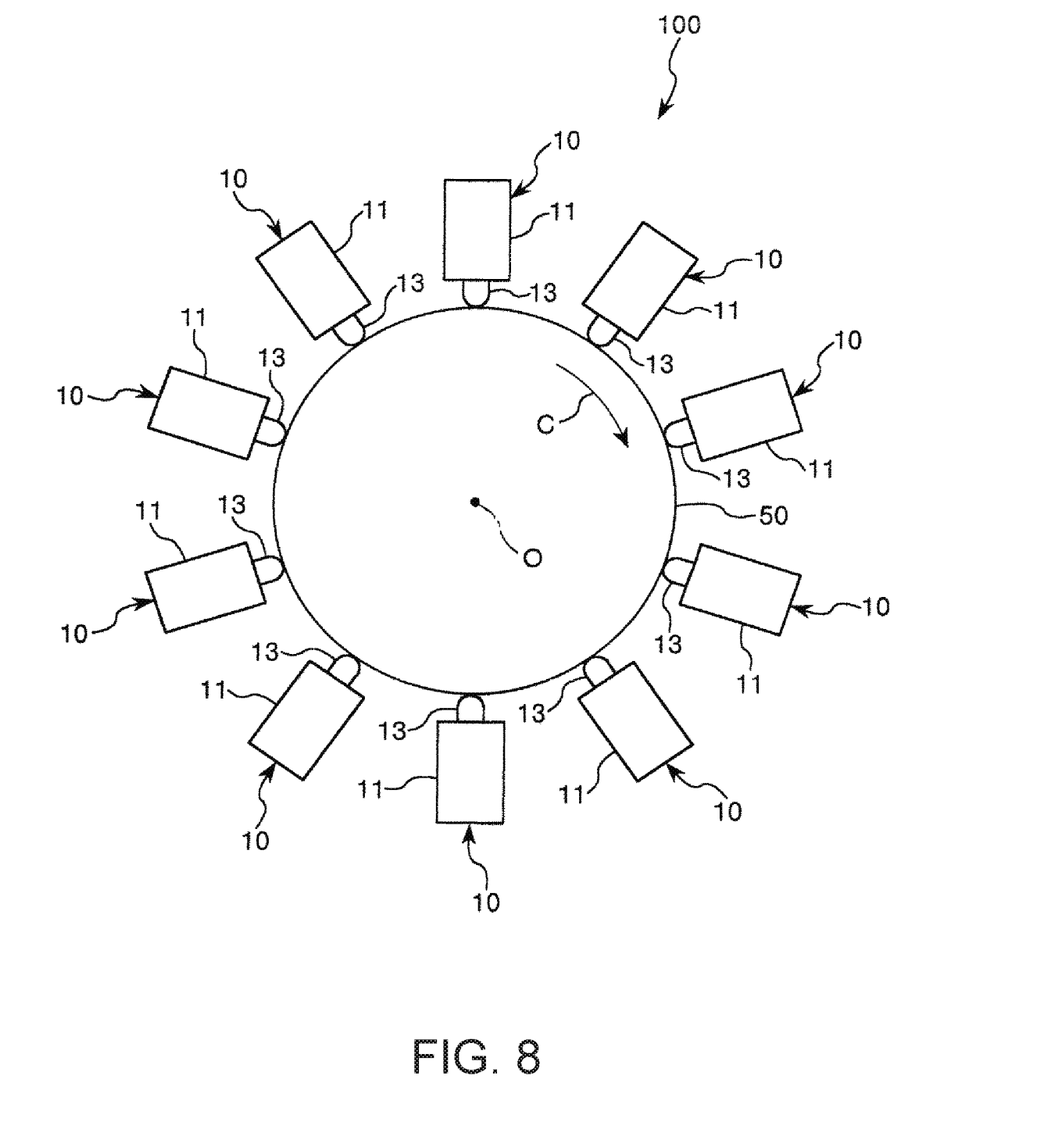
FIG. 8 is a schematic perspective view illustrating an embodiment of a piezoelectric motor of the invention.

FIG. 8 is a schematic perspective view illustrating an embodiment of a piezoelectric motor according to the invention.

A piezoelectric motor 100 illustrated in FIG. 8 has a rotor 50 that is a driven portion capable of rotating around a rotation axis O, and a plurality of piezoelectric vibrating bodies 10 that are disposed side by side along an outer peripheral surface of the rotor 50. In addition, although not illustrated, a drive circuit 20 similar to that of the first embodiment described above is electrically connected to the plurality of piezoelectric vibrating bodies 10. That is, the piezoelectric motor 100 includes the piezoelectric actuator 1 described above.

In such a piezoelectric motor 100, the rotor 50 is rotated in a direction indicated by an arrow C in FIG. 8 around the rotation axis O by driving (vibrating) each of the plurality of piezoelectric vibrating bodies 10.

According to the piezoelectric motor 100 including the piezoelectric actuator 1 as described above, even if apart of a plurality of piezoelectric elements 15a, 15b, 15c, and 15d fails due to disconnection or the like, it is possible to transmit a driving force to a driven portion by driving the remaining piezoelectric elements. Therefore, the piezoelectric motor 100 has excellent reliability.

In addition, since a plurality of sets of the piezoelectric elements 15 of stacked two piezoelectric element units 11 are provided, it is possible to transmit the driving force to a plurality of places of the driven portion.

3. Robot and Hand

Next, an embodiment of a robot and a hand according to the invention will be described.

Figure 9:
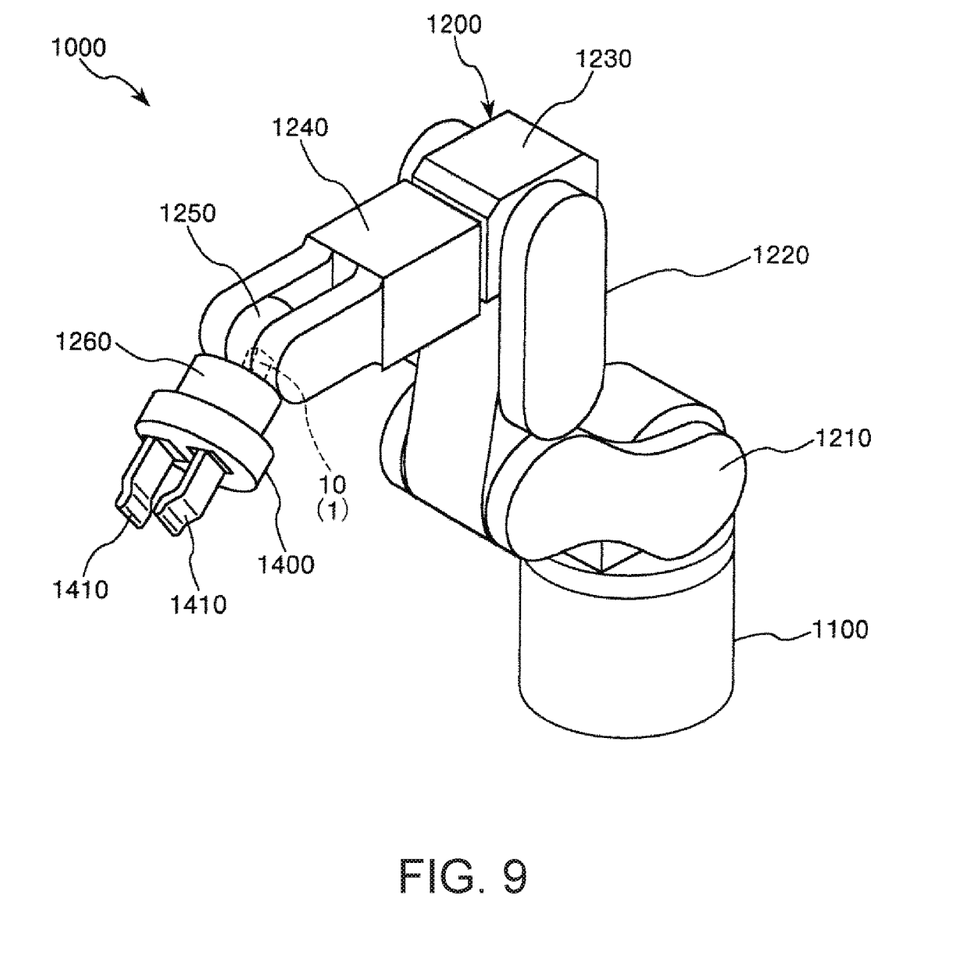
FIG. 9 is a schematic perspective view illustrating an embodiment of a robot of the invention.
Figure 10:
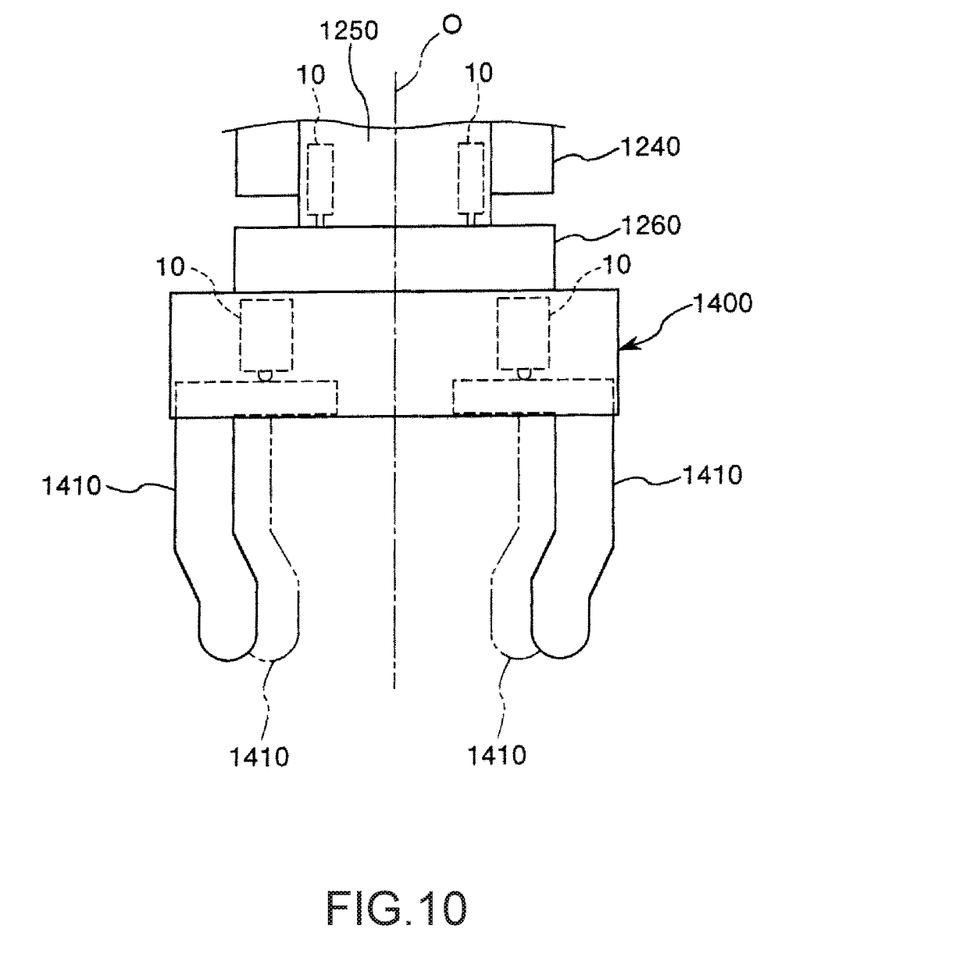
FIG. 10 is a schematic view explaining a hand included in the robot illustrated in FIG. 9.

FIG. 9 is a schematic configuration view illustrating the embodiment of the robot according to the invention. FIG. 10 is a schematic view explaining a multi-fingered hand included in the robot illustrated in FIG. 9.

A robot 1000 illustrated in FIG. 9 can perform work such as feeding, removing, conveying, and assembling of a precision apparatus, or materials of components (objects) configuring the precision apparatus, and the like.

The robot 1000 is a six-axis vertical multi-articulated robot and has a base 1100, a robot arm 1200 connected to the base 1100, and a force detector (not illustrated) and a hand 1400 provided at a distal end of the robot arm 1200. In addition, the robot 1000 has a plurality of drive sources (driving sources including a piezoelectric actuator 1) generating power for driving a robot arm 1200.

A base 1100 is a portion for attaching the robot 1000 to an arbitrary installation place. Moreover, the installation place of the base 1100 is not particularly limited, and examples thereof include a floor, a wall, a ceiling, a movable carriage, and the like.

The robot arm 1200 has a first arm 1210, a second arm 1220, a third arm 1230, a fourth arm 1240, a fifth arm 1250, and a sixth arm 1260 which are connected in this order from a proximal end side (base 1100 side) to a distal end side. The first arm 1210 is connected to the base 1100. For example, the hand 1400 (end effector) for gripping various components and the like is detachably attached to a distal end of the sixth arm 1260. The hand 1400 has two fingers 1410 and, for example, various components and the like can be gripped by the fingers 1410.

A plurality of piezoelectric vibrating bodies 10 are provided in the fifth arm 1250 as a drive source for driving the sixth arm 1260. In addition, although not illustrated, a drive source having a motor and a reduction gear is provided in each of the base 1100 and the first to fourth arms 1210 to 1240. Therefore, each drive source is controlled by a control device (not illustrated).

As illustrated in FIG. 10, the plurality of piezoelectric vibrating bodies 10 provided in the fifth arm 1250 are provided side by side around a rotation axis O of the sixth arm 1260 in a circumferential direction with respect to the fifth arm 1250. Therefore, each piezoelectric vibrating body 10 applies a driving force around the rotation axis O to an end surface of the sixth arm 1260. Therefore, it is possible to rotate the sixth arm 1260 around the rotation axis O with respect to the fifth arm 1250.

In addition, a plurality of piezoelectric vibrating bodies 10 are also provided in the multi-fingered hand 1400 corresponding to each finger 1410. Each piezoelectric vibrating body 10 applies a driving force in a direction approaching or separating from the rotation axis O to the fingers 1410. Therefore, it is possible to move two fingers 1410 in a direction in which the two fingers 1410 approach or separate from each other.

According to the robot 1000 and the multi-fingered hand 1400 as described above, since each thereof includes the piezoelectric actuator 1, it is possible to exert excellent reliability.

4. Pump

Next, an embodiment of a pump according to the invention will be described.

Figure 11:
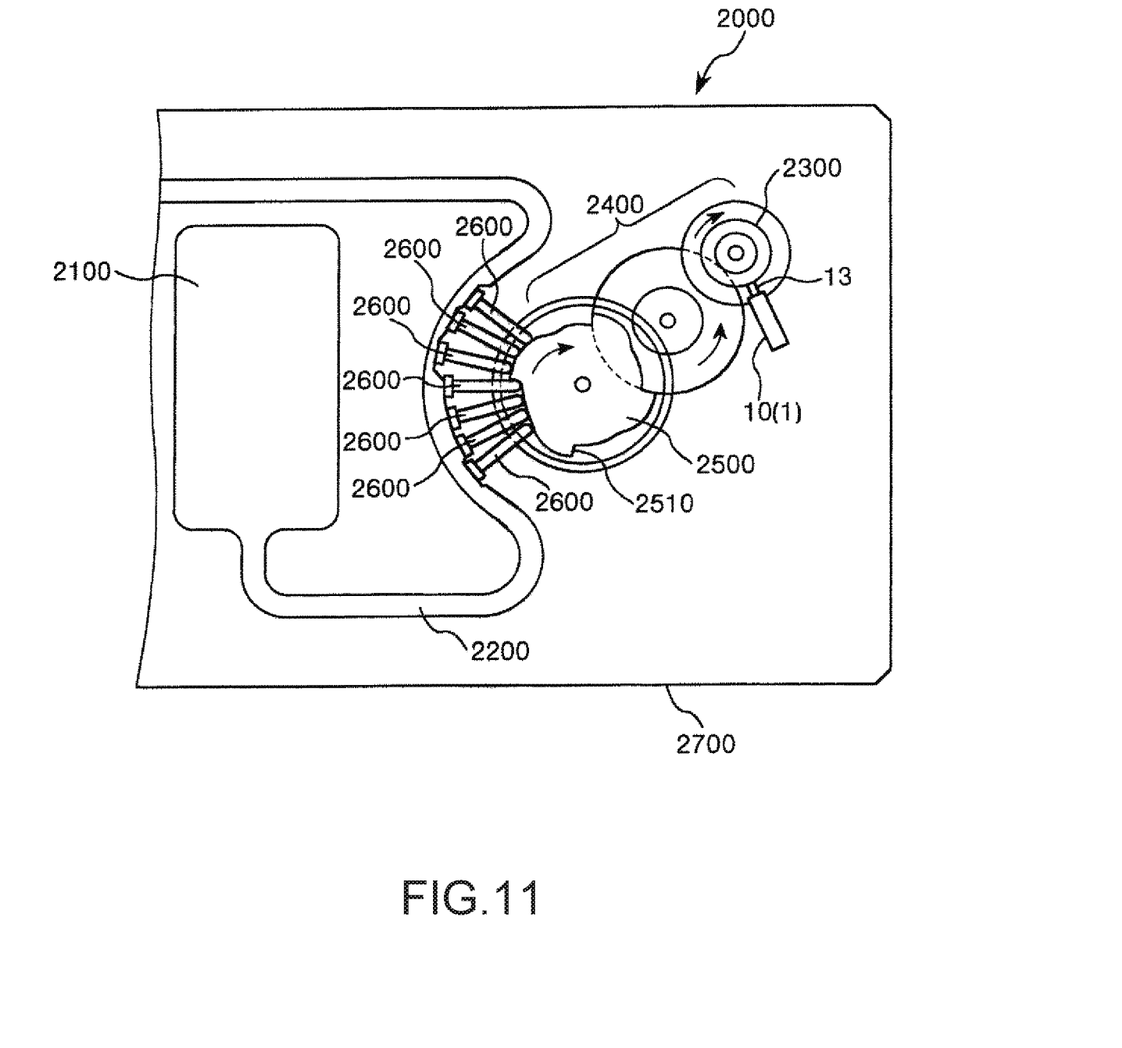
FIG. 11 is a schematic view illustrating an embodiment of a pump of the invention.

FIG. 11 is a schematic view illustrating the embodiment of the pump according to the invention.

A liquid feed pump 2000 (pump) illustrated in FIG. 11 has a reservoir 2100, a tube 2200, a piezoelectric actuator 1, a rotor 2300, a reduction transmission mechanism 2400, a cam 2500, and a plurality of fingers 2600 which are housed in a case 2700. A liquid to be transmitted is stored in the reservoir 2100. The tube 2200 is a flexible pipe having a flow path for transporting the liquid from the reservoir 2100. A projection member 13 comes into contact with an outer peripheral surface of the rotor 2300 and thereby the plurality of piezoelectric vibrating bodies 10 included in the piezoelectric actuator 1 drives the rotor 2300 to be rotated. A rotational force of the rotor 2300 is transmitted to the cam 2500 via the reduction transmission mechanism 2400. The plurality of fingers 2600 are arranged side by side along a longitudinal direction of the tube 2200 and is pushed toward the tube 2200 by a protrusion portion 2510 provided on the outer peripheral surface of the cam 2500 in order in accordance with the rotation of the cam 2500. Therefore, the plurality of fingers 2600 sequentially press and close the tube 2200 from the finger 2600 on an upstream side to the finger 2600 on a downstream side of the tube 2200 in a transporting direction of the liquid. Then, the liquid within the tube 2200 is transported from the upstream side to the downstream side in the transporting direction.

According to such a liquid feed pump 2000, it is possible to feed a small amount of a liquid with high accuracy and it is possible to downsize the entire liquid feed pump 2000. Therefore, the liquid feed pump 2000 can be suitably used, for example, in a medicine dispensing device for administering a medicine liquid such as insulin to a human body and the like.

Particularly, according to the liquid feed pump 2000, for example, it is possible to exert excellent reliability by providing the piezoelectric actuator 1.

Above, the piezoelectric actuator, the piezoelectric motor, the robot, the hand, and the pump according to the invention are described with reference to the illustrated embodiments, but the invention is not limited to the embodiments. The configuration of each portion can be replaced with an arbitrary configuration having the same function. In addition, any other configurations may be added to the invention. In addition, each embodiment may be appropriately combined.

The disclosure of Japanese Patent Application No. 2016-063182 filed on Mar. 28, 2016 including the specification, drawings and abstract is incorporated herein by reference in its entirety.

What is claimed is:

1. A piezoelectric actuator comprising:
    a substrate including a driving section connected to a fixed section by a pair of connecting sections that permit the driving section to move relative to the fixed section:
    a plurality of piezoelectric elements each arranged on a plane of the driving section that generate a driving force to be transmitted to the driven section that move the driving section relative to the fixed section; and
    a power supply portion that supplies power to the plurality of piezoelectric elements,
    wherein the plurality of piezoelectric elements are electrically connected to the power supply portion in parallel, and
    the plurality of piezoelectric elements include a piezoelectric element and a second piezoelectric element that are arranged to face each other.

2. The piezoelectric actuator according to claim 1, wherein the plurality of piezoelectric elements are stacked on one another.

3. The piezoelectric actuator according to claim 2, including a plurality of sets of the stacked plurality of piezoelectric elements.

4. The piezoelectric actuator according to claim 1, wherein the driving force is a force for rotating the driven portion.

5. The piezoelectric actuator according to claim 1, further comprising:
    a coil that is electrically connected to the plurality of piezoelectric elements in parallel.

6. The piezoelectric actuator according to claim 5, wherein an inductance of the coil is variable.

7. A piezoelectric motor comprising:
    the piezoelectric actuator according to claim 1.

8. A robot comprising:
    the piezoelectric actuator according to claim 1.

9. A hand comprising:
    the piezoelectric actuator according to claim 1.

10. A pump comprising:
    the piezoelectric actuator according to claim 1.

* * * * *